United States Patent
Chun et al.

(10) Patent No.: US 8,179,788 B2
(45) Date of Patent: May 15, 2012

(54) PROTECTION SWITCHING METHOD AND APPARATUS FOR USE IN RING NETWORK

(75) Inventors: Kyung-gyu Chun, Daejeon (KR); Soon-seok Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 537 days.

(21) Appl. No.: 12/134,696

(22) Filed: Jun. 6, 2008

(65) Prior Publication Data
US 2009/0147672 A1 Jun. 11, 2009

(30) Foreign Application Priority Data
Dec. 10, 2007 (KR) .................. 10-2007-0127873

(51) Int. Cl.
*H04L 12/26* (2006.01)
(52) U.S. Cl. ........................ 370/224; 370/249
(58) Field of Classification Search .................. 370/218, 370/221–225, 236, 236.1, 236.2, 410, 216–228, 370/242–245, 248–249; 398/1–5, 58–59
See application file for complete search history.

(56) References Cited

U.S. PATENT DOCUMENTS

| 5,333,130 | A | * | 7/1994 | Weissmann et al. | 370/221 |
| 5,751,696 | A | | 5/1998 | Bechtel et al. | |
| 6,597,689 | B1 | * | 7/2003 | Chiu et al. | 370/354 |
| 6,728,207 | B1 | * | 4/2004 | Askinger et al. | 370/224 |
| 6,850,486 | B2 | * | 2/2005 | Saleh et al. | 370/218 |
| 7,606,224 | B2 | * | 10/2009 | Notani et al. | 370/386 |
| 2002/0067700 | A1 | * | 6/2002 | Shimadoi et al. | 370/258 |
| 2003/0035371 | A1 | * | 2/2003 | Reed et al. | 370/230 |
| 2003/0043736 | A1 | * | 3/2003 | Gonda | 370/218 |
| 2005/0207348 | A1 | | 9/2005 | Tsurumi et al. | |

FOREIGN PATENT DOCUMENTS

JP 4-172035 6/1992

* cited by examiner

*Primary Examiner* — Thai Hoang
(74) *Attorney, Agent, or Firm* — Nelson Mullins Riley & Scarborough LLP; EuiHoon Lee, Esq.

(57) ABSTRACT

A protection switching method and apparatus for use in a ring network are provided. At least two switching request signals are received from a network device neighboring a link in which a failure occurs. A switching operation is performed in response to a first received signal of the at least two received switching request signals. When a network failure occurs, fast protection switching can be performed.

13 Claims, 10 Drawing Sheets

PROTECTION SWITCHING METHOD AND APPARATUS FOR USE IN RING NETWORK

CROSS REFERENCE TO RELATED APPLICATIONS

This application claims priority from Korean Patent Application No. 10-2007-0127873, filed on Dec. 10, 2007, the disclosure of which is incorporated herein in its entirety by reference.

BACKGROUND OF THE INVENTION

1. Field of the Invention

The present invention relates to a network technology, and more particularly, to a network switching technology.

This work was supported by the IT R&D program of Ministry of Information and Communication (MIC)/Institute for Information Technology Advancement (IITA) [2006-S-064-02, BcN Network Engineering].

2. Description of the Related Art

In general, data traffic in a network may be switched and protected when a failure occurs in a transmission section in which the traffic is sent. For example, when a protection link is designated and a network link failure occurs, the data traffic may be switched and sent through the designated protection link.

Specifically, when a failure occurs in the system, a designated master network device may receive a failure notification from a network device on a packet transmission path. Then, the master network device may switch data traffic to the protection link by activating a previously blocked port.

However, when a path between the network device for providing the failure notification and the master network device is not a short distance, in the above-described method, reception of a failure notification signal may be delayed. For this reason, there is a problem in that the loss of data traffic increases and the network performance decreases when the protection switching is delayed. In particular, there is a problem in that the reception of a switching request signal according to the failure is further delayed when the failure occurs in a link farthest from the master network device.

Accordingly, there is need of an apparatus and method capable of performing fast protection switching even when the distance between the network device for providing the failure notification and the master network device is large.

SUMMARY OF THE INVENTION

The present invention provides a protection switching method and apparatus that can perform fast protection switching when a network failure occurs, more particularly, a protection switching method and apparatus that can perform fast protection switching when a unidirectional or bidirectional link failure occurs in a network device.

The present invention discloses a method for protection switching between network devices in a ring network, including: receiving at least two switching request signals from a network device neighboring a link in which a failure occurs; and performing a switching operation in response to a first received signal of the at least two received switching request signals.

The present invention also discloses a network device for use in a ring network, including: a receiver that receives at least two switching request signals from a network device neighboring a link in which a failure occurs; and a switch that performs a switching operation in response to a first received signal of the at least two received switching request signals.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
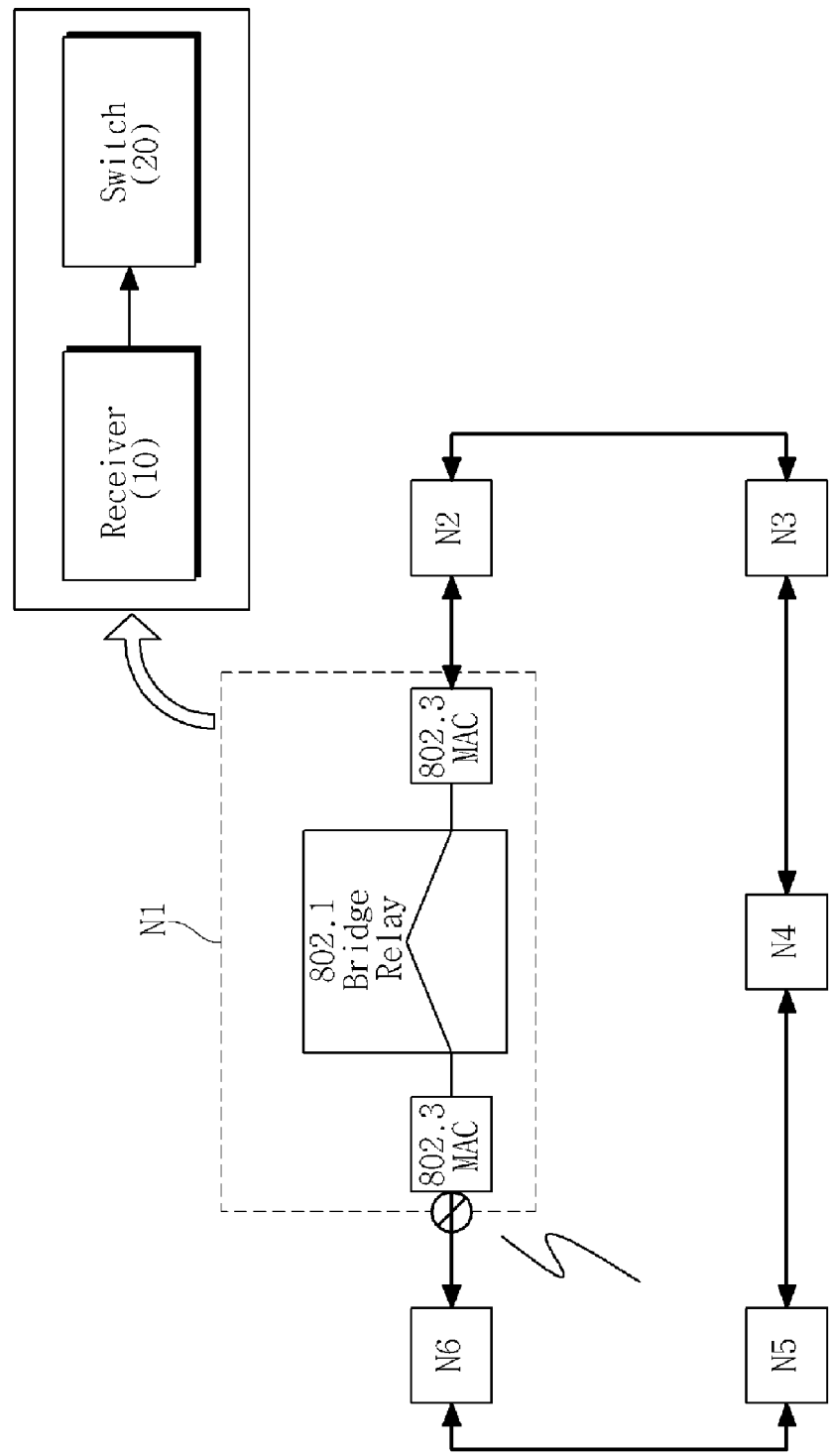
FIG. 1 is a block diagram showing a configuration of a network device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram showing a configuration of a network device according to an exemplary embodiment of the present invention.

Referring to FIG. 1, a network according to an exemplary embodiment of the present invention can be a closed network, that is, a ring network. Here, the network can be an Ethernet network.

The network is implemented with IEEE 802.3 media access control (MAC) entities in west and east ports, between which an IEEE 802.1 bridge relay is located in a network device configuring the network, that is, a node N1. A port of a specific node in the ring network is blocked such that an open loop can be logically configured. That is, a closed loop is physically configured by mutually connecting network devices, but the closed network could alternatively be configured by logically forming an open loop.

According to an exemplary embodiment of the present invention, a master node, which is a master network device, can be designated for protection switching in the closed network. Here, the master node includes a receiver 10 and a switch 20 as show in FIG. 1.

The receiver 10 receives at least two switching request signals from a network device on a packet transmission path, that is, a node, according to a failure. The switching request signals can be a remote defect indication (RDI) and/or an alarm indication signal (AIS). The RDI and the AIS are included in an operation, administration and maintenance (OAM) signal.

Specifically, the receiver 10 can receive various switching request signals according to failure type, which includes unidirectional and bidirectional link failures.

When the unidirectional link failure occurs, the receiver 10 of the master network device can receive at least two switching request signals from a network device neighboring a link in which the unidirectional failure occurs. Here, the switching request signals can include at least one of the RDI and the AIS.

When the bidirectional link failure occurs, the receiver 10 of the master network device can receive at least two switching request signals from at least two network devices neighboring a link in which the bidirectional failure occurs. At this time, the switching request signals can be AISs.

On the other hand, the switch 20 performs a switching operation in response to a first received signal of at least two switching request signals received through the receiver 10. Here, fast switching can be performed in response to the first received signal of the switching request signals, that is, the RDI and/or the AIS.

At this time, the switch 20 can perform the switching operation in response to the first received switching request signal and discard a subsequently received switching request signal. When the switching request signal is no longer received, a return to a state before protection switching can be made.

An apparatus and method for performing fast protection switching when the unidirectional or bidirectional link failure occurs in the closed network will be described in detail with reference to FIGS. 2 to 10.

Figure 2:
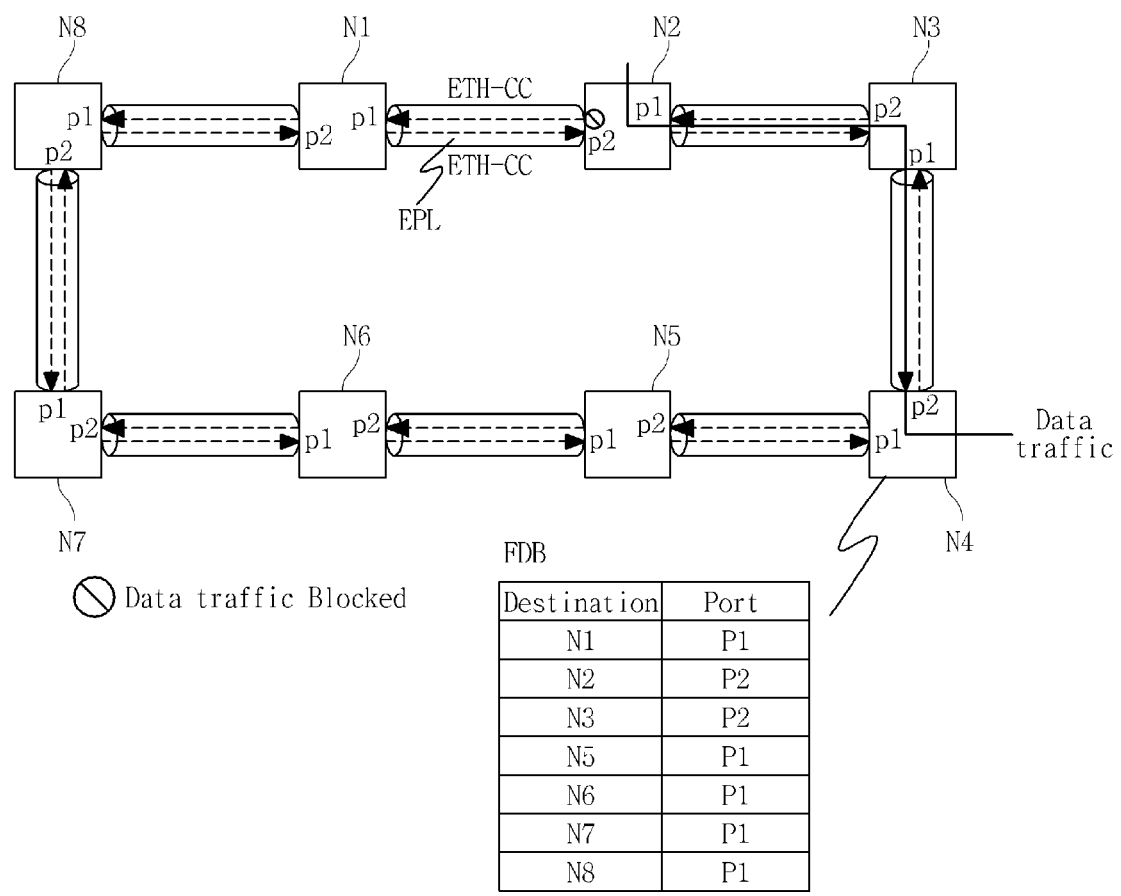
FIG. 2 is a reference diagram illustrating a data traffic flow in a closed network according to an exemplary embodiment of the present invention.

FIG. 2 is a reference diagram illustrating a data traffic flow in the closed network according to an exemplary embodiment of the present invention.

Referring to FIG. 2, a master node and a protection link can be designated for protection switching in the closed network which is in a normal state before a network failure occurs. When the closed network is an Ethernet network, the protection link can be an Ethernet protection link (EPL).

For example, in an Ethernet ring network, a node N2 can be designated as the master node, as shown in FIG. 2. Here, an open loop can be logically formed by blocking a port p2. When the node N2 is the master node, the EPL can be a link between nodes N1 and N2.

On the other hand, a link is periodically monitored by an Ethernet continuity check (ETH-CC) recommended in ITU-T Y.1730 in order to detect a failure of a link between nodes. For example, the blocked port p2 of the master node N2 blocks only data traffic while an ETH-CC signal can still be exchanged between the nodes N1 and N2.

Although not shown in FIG. 2, the ETH-CC signal can be exchanged between all neighboring nodes including the nodes N1 and N2. At this time, in the normal state, a forwarding database (FDB) can be automatically generated by MAC learning and data traffic can flow between the nodes N2 and N4 as shown in FIG. 2.

The FDB is a table for designating positions of ports capable of sending and receiving traffic between nodes in the ring network. At this time, the data traffic can be sent and received through the ports designated in the FDB.

Figure 3:
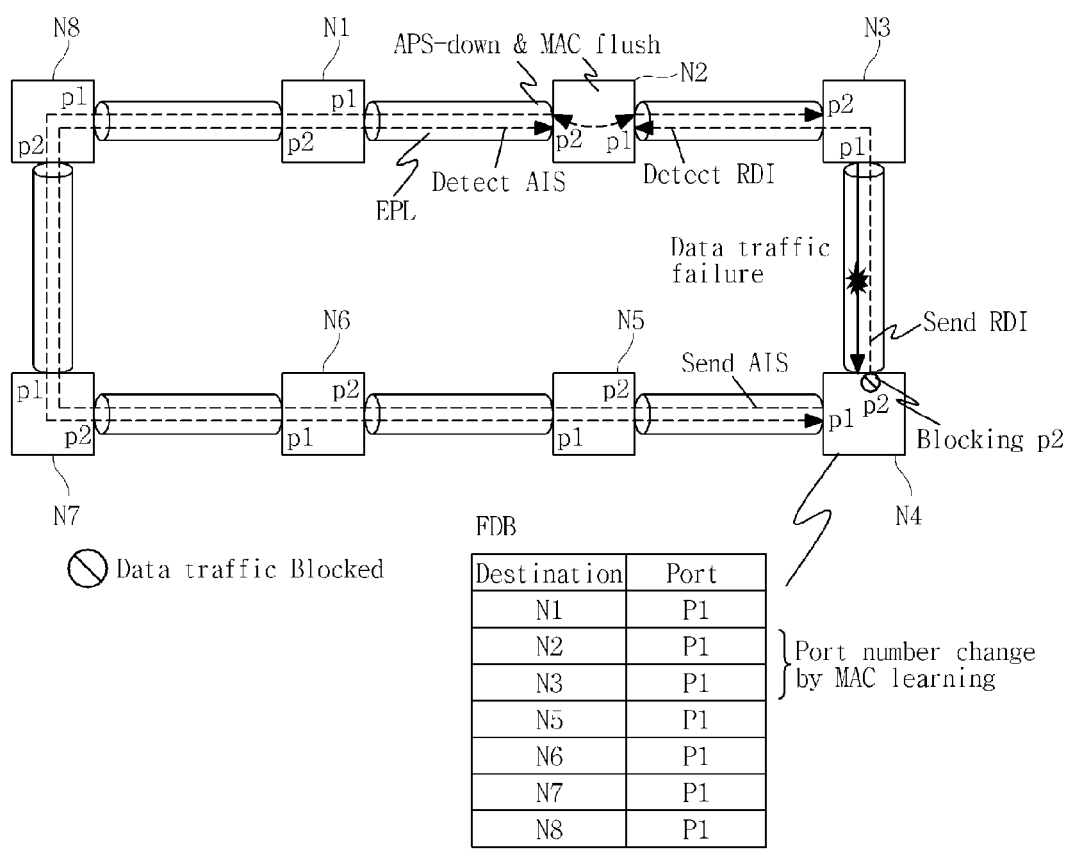
FIG. 3 is a reference diagram illustrating a protection switching process when a unidirectional failure occurs according to an exemplary embodiment of the present invention.

FIG. 3 is a reference diagram illustrating a protection switching process when a unidirectional failure occurs according to an exemplary embodiment of the present invention.

Referring to FIG. 3, the master network device receives at least two switching request signals for protection switching from a network device neighboring a link in which the unidirectional failure occurs. For example, when the unidirectional link failure occurs between nodes N3 and N4, as shown in FIG. 3, the node N2, being the master network device, receives at least two switching request signals from the network device neighboring the failed link.

That is, the master node N2 can receive an RDI signal generated from a port p2 of the node N4 that detected the unidirectional failure through a path directed to a port p1 of the node N3. An AIS generated from a port p1 of the node N4 can be received through a path directed to a port p2 of a node N5.

When the AIS and the RDI are received, the master node N2 first receives the RDI since an RDI transfer path is shorter than an AIS transfer path. Accordingly, the master node N2 can perform protection switching using the EPL by unblocking the blocked port p2 of the node N2 using the first arrived RDI. At this time, automatic protection switching (APS)-down & MAC flush messages are sent to the nodes N1 and N3 and the FDB for nodes in the ring network is updated. The APS-down message is used to notify each node that the EPL is in use, and the MAC flush message is used to update the FDB.

On the other hand, the neighbor node interrupts a data transmission to a link in which the unidirectional failure occurs by blocking one port after generating a protection switching signal. For example, as shown in FIG. 3, the neighbor node N4 interrupts data traffic from the node N4 to the node N3 by blocking the port p2 of the node N4 after generating the RDI. Accordingly, the EPL is open and an intermediate between the node N3 and the node N4 is blocked. Therefore, another type of ring network is configured with protection switching. At this time, since all FDB entries are initialized by a MAC flush signal after a new ring network is configured, each node can automatically generate the FDB by a MAC learning function. For example, destination ports p2 of the nodes N2 and N3 as shown in FIG. 2 can be changed to destination ports p1 by MAC learning as shown in FIG. 3.

Consequently, when the unidirectional link failure occurs in the closed network, the master network device can receive an RDI and an ASI through both ports of a network device neighboring the failed link. At this time, fast switching can be performed using a first received switching request signal.

Figure 4:
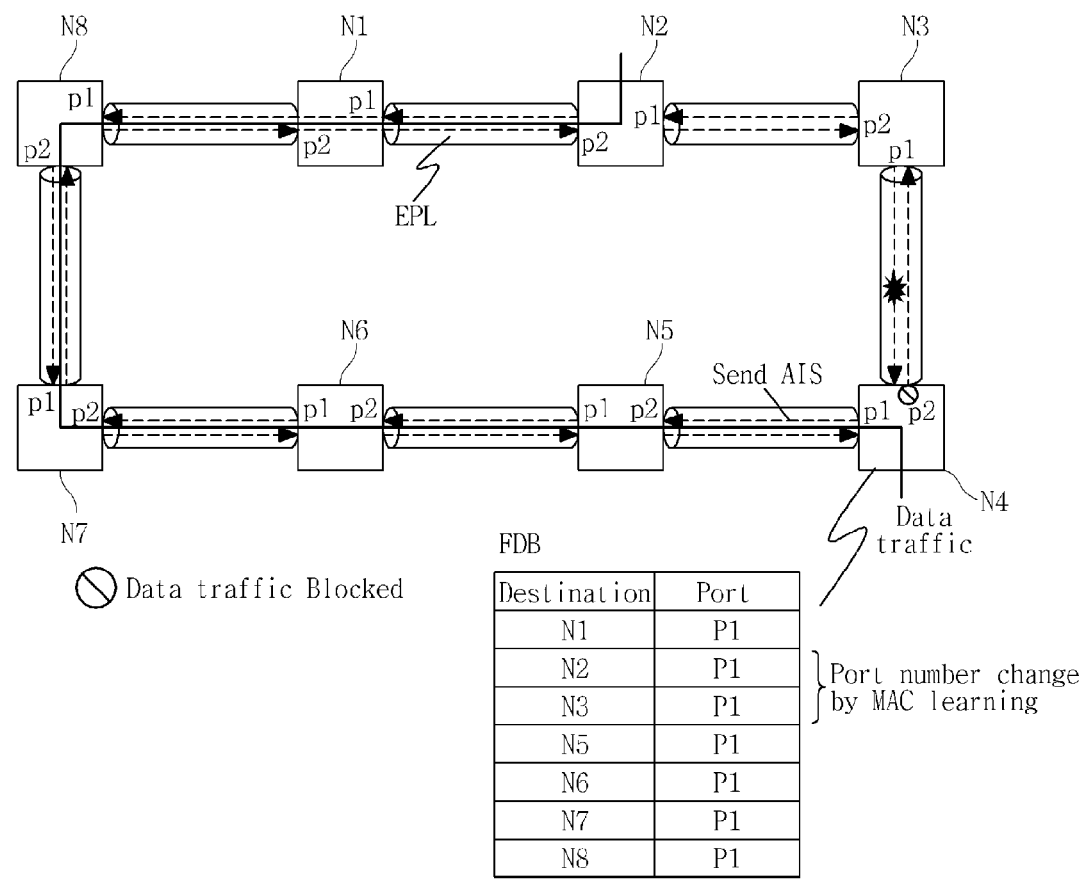
FIG. 4 is a reference diagram illustrating a data traffic flow after protection switching when the unidirectional failure occurs according to an exemplary embodiment of the present invention.

FIG. 4 is a reference diagram illustrating a data traffic flow after protection switching when the unidirectional failure occurs according to an exemplary embodiment of the present invention.

Referring to FIG. 4, the nodes N2 and N4 can be connected through the node N3 before the unidirectional link failure, as shown in FIG. 2, but a new ring network connected with nodes N2-N1-N8- . . . -N4 can be formed through the EPL after protection switching.

Figure 5:
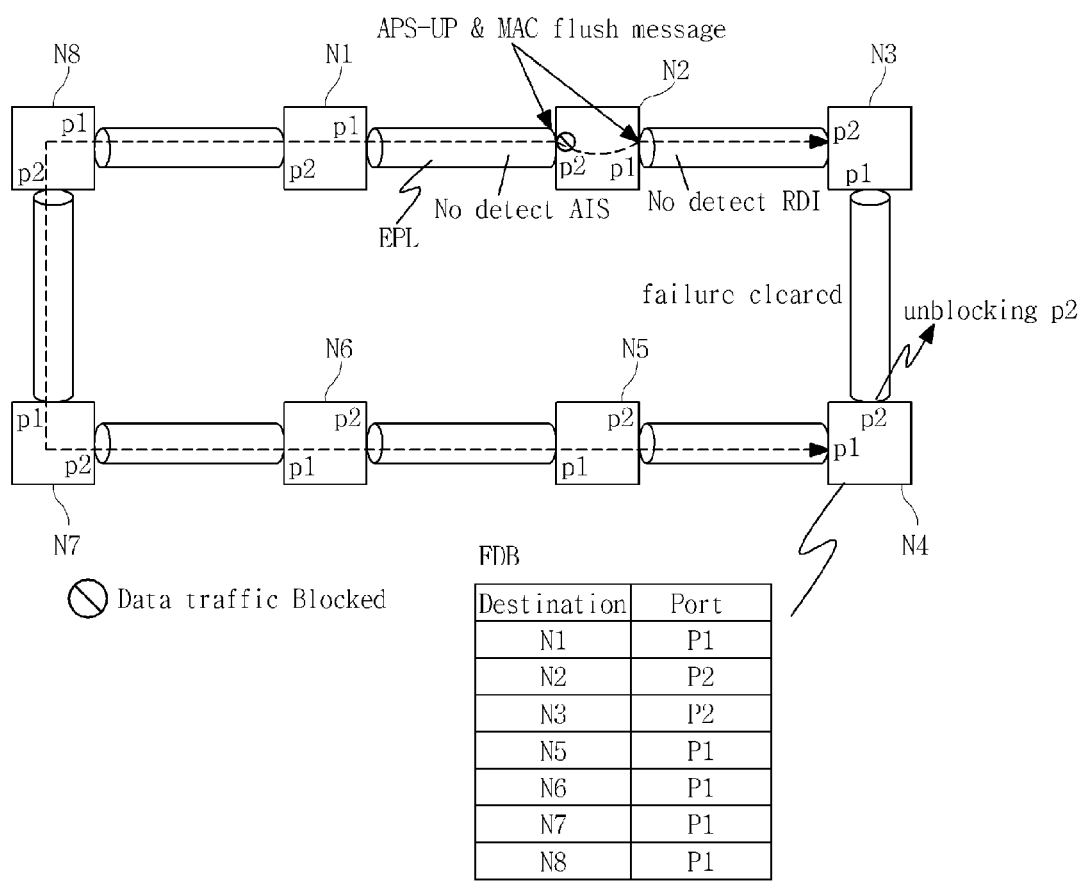
FIG. 5 is a reference diagram illustrating a recovery process when the unidirectional failure occurs according to an exemplary embodiment of the present invention.

FIG. 5 is a reference diagram illustrating a recovery process when the unidirectional failure occurs according to an exemplary embodiment of the present invention.

Referring to FIG. 5, when the RDI and the AIS are not received after a predetermined time has elapsed, the master node N2 determines that the network has recovered from the unidirectional failure and returned to the normal state. Accordingly, the master node N2 sends APS-up & MAC flush control signals through the ports p1 and p2 thereof. The EPL is secured by reblocking the port p2. When the failure is recovered from, an FDB is updated through the MAC flush signal sent from the master node N2.

On the other hand, a node neighboring a link in which the unidirectional failure occurs, for example, the neighbor node N4, unblocks the blocked port p2 thereof. Accordingly, data traffic can flow between the nodes N3 and N4.

Figure 6:
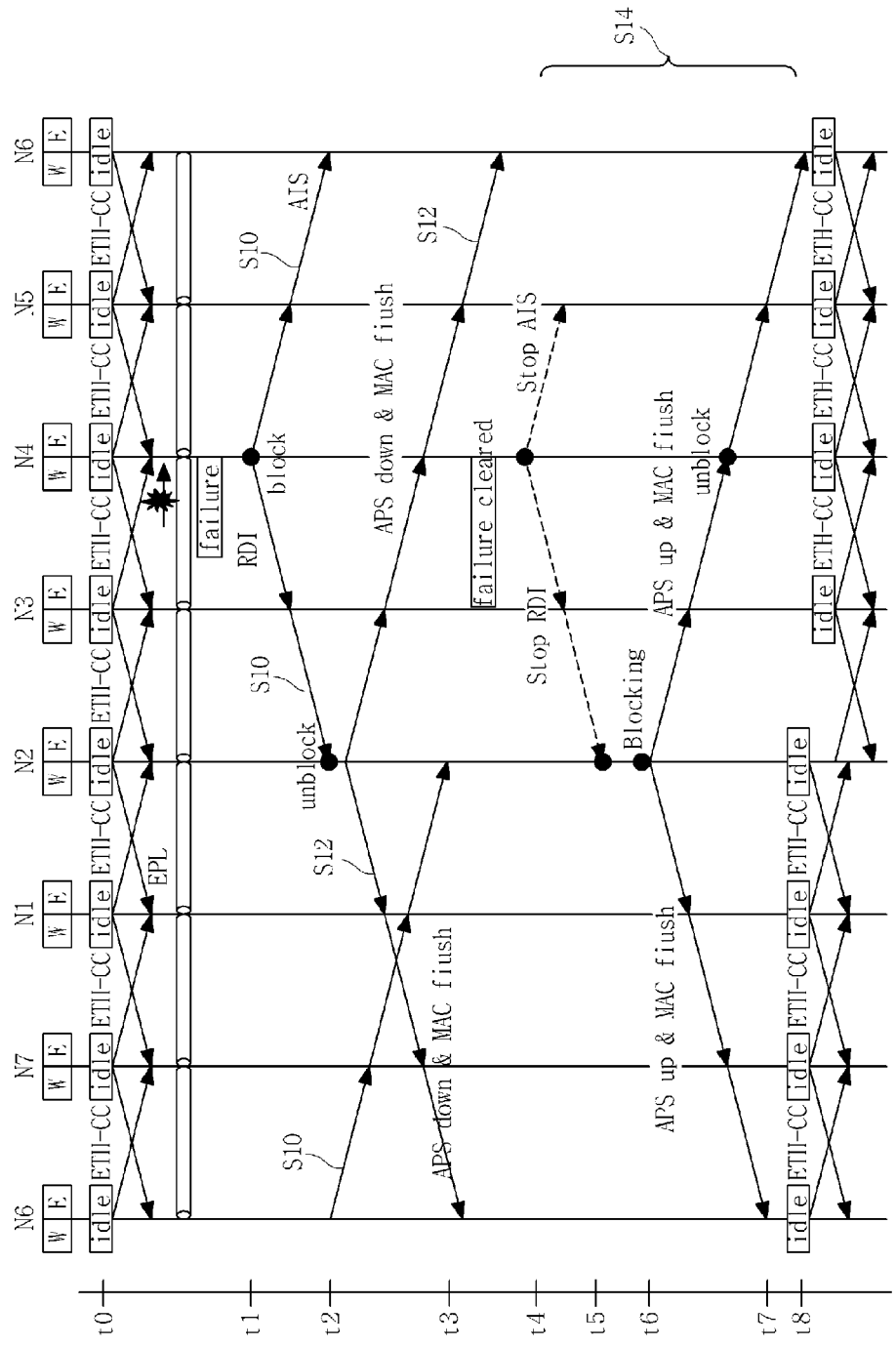
FIG. 6 is a flow diagram showing a protection switching method when the unidirectional failure occurs according to an exemplary embodiment of the present invention.

FIG. 6 is a flow diagram showing a protection switching method when the unidirectional failure occurs according to an exemplary embodiment of the present invention.

Referring to FIG. 6, when the unidirectional link failure occurs in a closed network, particularly a ring network, the master node receives at least two switching request signals from ports of a node neighboring the link in which the unidirectional failure occurs (S10). Here, the switching request signals can include at least one of an RDI and an AIS. For example, when the node N4 is the node neighboring the link in which the unidirectional failure occurs, the node N4 sends the RDI and the AIS to the node N2, which is the master node, and blocks the failed port.

Then, the master node performs a switching operation in response to a first received signal of at least two received switching request signals (S12). For example, when the master node N2 receives the RDI and the AIS from the neighbor node N4, the RDI is received earlier than the RDI through the node N3, as shown in FIG. 6. Accordingly, the master node N2 performs a switching operation using the RDI as a switching request signal for generating APS-down & MAC flush signals. Therefore, a protection switching time can be shortened by performing the switching operation using the first received switching request signal.

The master node discards a subsequently received switching request signal. For example, the master node N2 discards the subsequently received AIS, as shown in FIG. 6, so as to prevent APS-down & MAC flush messages from being redundantly generated. The master node N2 unblocks a previously blocked port using an RDI signal first received by the master node N2 and notifies that a current EPL is in use by sending an APS-down message to all nodes. The FDB can be updated by sending a MAC flush message.

On the other hand, when the master node no longer receives the switching request signal, the ring network returns to a state before protection switching (S14).

For example, when a unidirectional failure between the nodes N3 and N4 is recovered from, the AIS and the RDI are no longer received by the master node N2, such that the FDB is updated by notifying that the switching is released by sending the APS-up & MAC flush signals. At this time, the failure state can be monitored when an ETH-CC signal is exchanged between nodes according to the return to the normal state.

Figure 7:
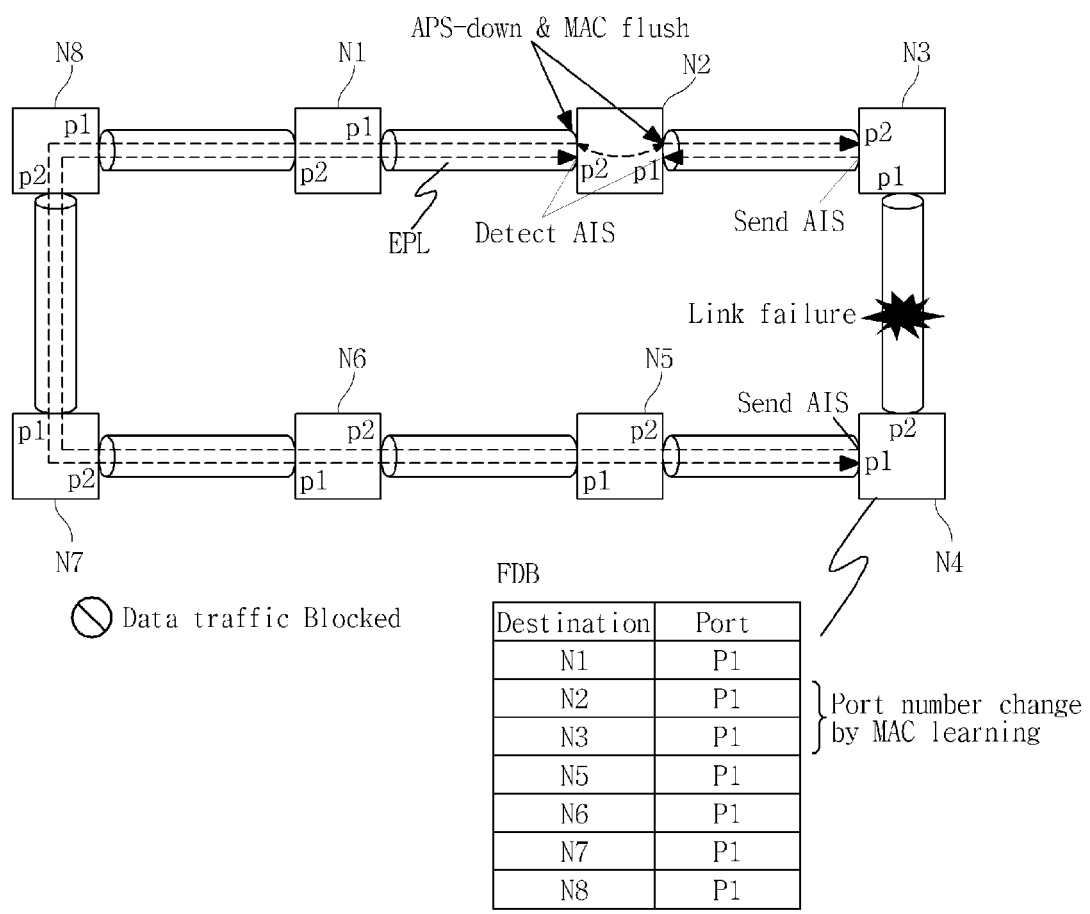
FIG. 7 is a reference diagram illustrating a protection switching process when a bidirectional failure occurs according to another exemplary embodiment of the present invention.

FIG. 7 is a reference diagram illustrating a protection switching process when a bidirectional failure occurs according to another exemplary embodiment of the present invention.

Referring to FIG. 7, a master node receives switching request signals from at least two network nodes neighboring a link in which a bidirectional failure occurs, which is different from when the unidirectional failure occurs. At this time, the switching request signals can be AISs.

For example, when the bidirectional failure occurs in a link between nodes N3 and N4, the nodes N3 and N4, being neighbor nodes, each generate the AIS and send the generated AIS to a master node N2. The master node N2 first receives the AIS from the node N3.

In this case, the master node N2 generates APS-down & MAC flush control signals using the first received AIS and unblocks a previously blocked port p2 thereof. Accordingly, it is possible to perform fast protection switching using a first received protection switching signal in the event of bidirectional failure as well as in the event of unidirectional failure.

The master node N2 sends the APS-down & MAC flush control signals to the nodes N3 and N4 through ports p1 and p2 thereof. At this time, all nodes receiving the APS-down & MAC flush control signals determine that the switching operation is performed and therefore an FDB is updated.

Figure 8:
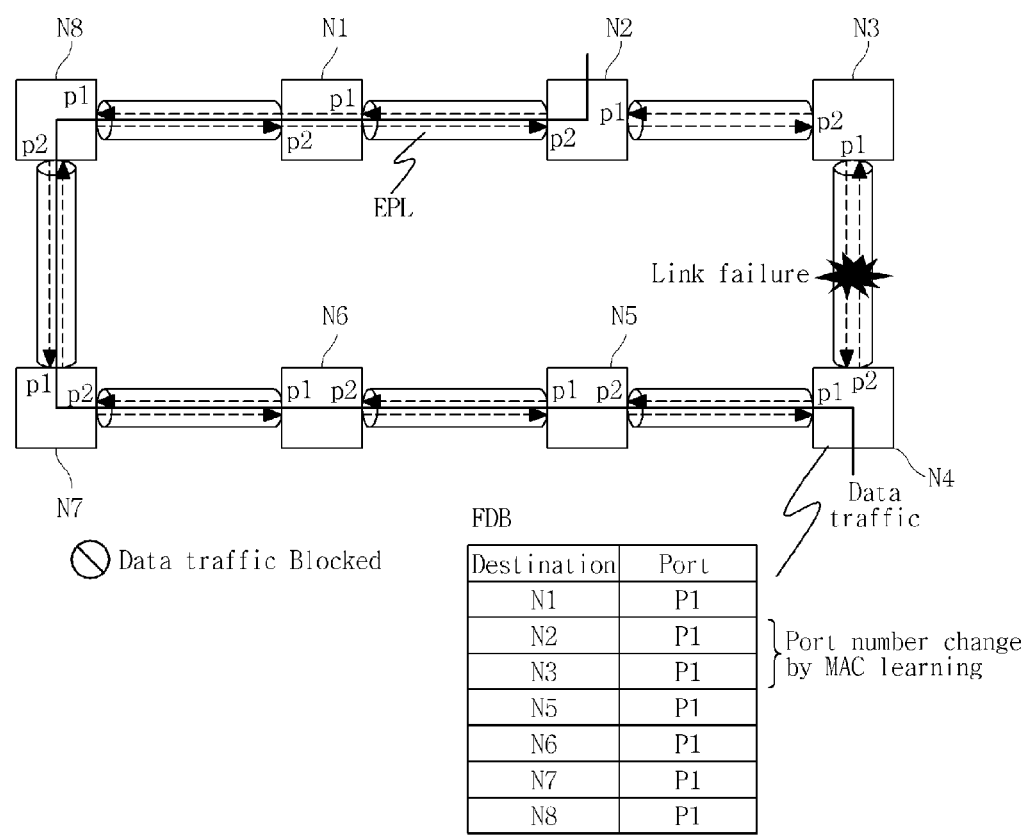
FIG. 8 is a reference diagram illustrating a data traffic flow after protection switching when the bidirectional failure occurs according to another exemplary embodiment of the present invention.

FIG. 8 is a reference diagram illustrating a data traffic flow after protection switching when the bidirectional failure occurs according to another exemplary embodiment of the present invention.

Referring to FIG. 8, a new transmission path of a connection of nodes N2-N1-N8- . . . -N4 between the nodes N2 and N4 is generated by a newly updated FDB after protection switching, such that data traffic can flow.

Figure 9:
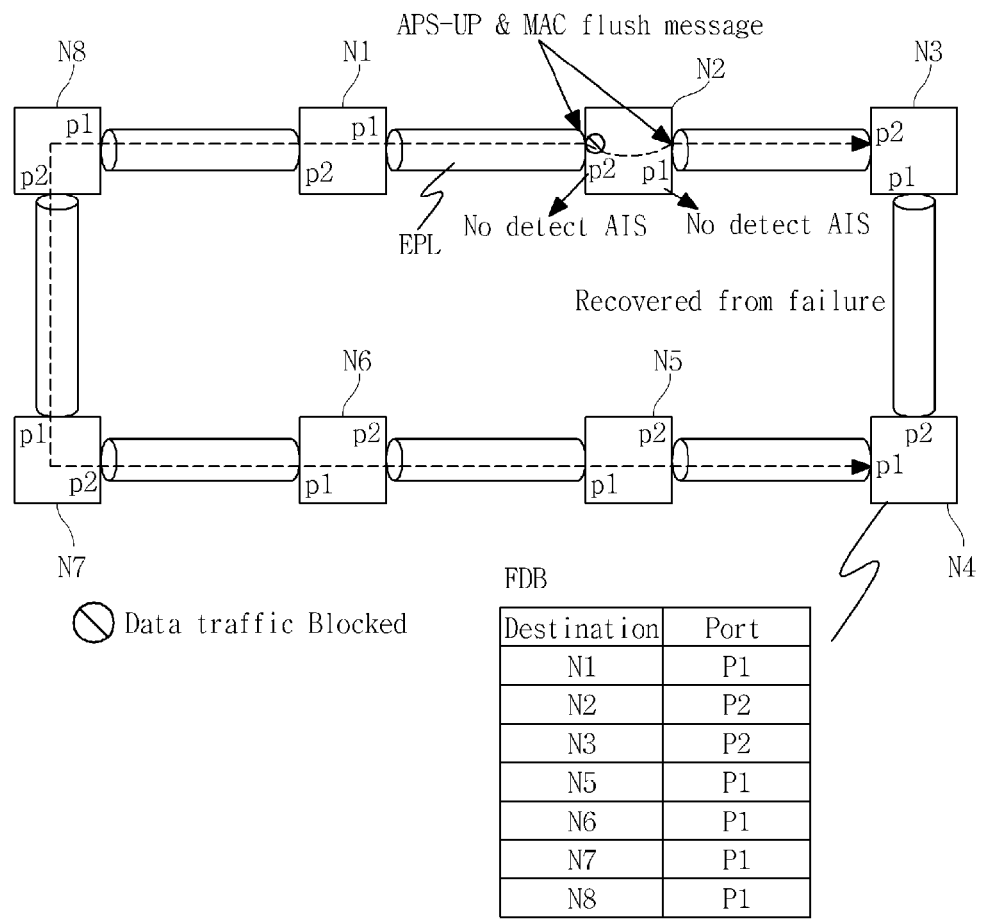
FIG. 9 is a reference diagram illustrating a recovery process when the bidirectional failure occurs according to another exemplary embodiment of the present invention.

FIG. 9 is a reference diagram illustrating a recovery process when the bidirectional failure occurs according to another exemplary embodiment of the present invention.

Referring to FIG. 9, the master node determines that the network has recovered from the bidirectional failure when no AIS is received after a predetermined time has elapsed. For example, when the master node N2 receives no AIS, as shown in FIG. 9, it is determined that the network has recovered from the bidirectional failure and returned to the normal state. Accordingly, the master node N2 can transmit the APS-up & MAC flush control signals through the ports p1 and p2 thereof, and can secure an EPL by reblocking the port p2. When the failure has been recovered from, the master node N2 sends a MAC flush signal to each node and therefore the FDB can be updated.

On the other hand, a node neighboring a link in which the bidirectional failure occurs, for example, the neighbor node N4 shown in FIG. 9, updates the FDB by receiving APS-up & MAC flush messages, thereby normally sending data traffic.

Figure 10:
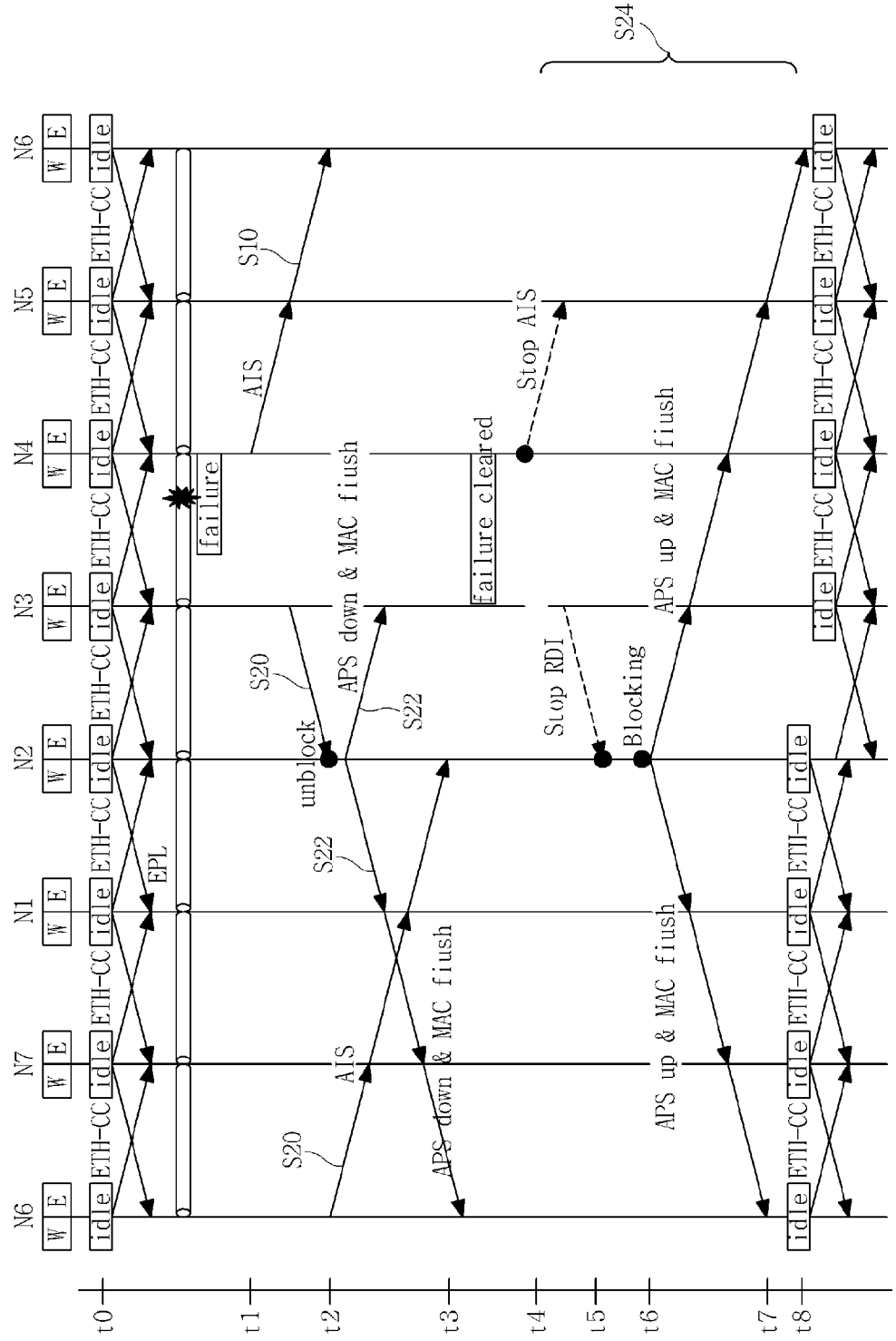
FIG. 10 is a flow diagram showing a protection switching method when the bidirectional failure occurs according to another exemplary embodiment of the present invention.

FIG. 10 is a flow diagram showing a protection switching method when the bidirectional failure occurs according to another exemplary embodiment of the present invention.

Referring to FIG. 10, when the bidirectional link failure occurs in a closed network, particularly, an Ethernet ring network, the master node receives at least two switching request signals from at least two nodes neighboring the link in which the bidirectional failure occurs (S20). Here, the switching request signals can include the AIS. For example, when the nodes N3 and N4 are nodes neighboring the link in which the bidirectional failure occurs, the nodes N3 and N4 send the AIS to the master node N2.

At this time, the master node N2 performs a switching operation in response to a first received signal of at least two received switching request signals (S22). For example, when the master node N2 receives the AIS from the neighbor nodes N3 and N4, the AIS sent from the node N3 is first received as shown in FIG. 10. Accordingly, the master node N2 performs a switching operation using the AIS as a switching request signal for generating APS-down & MAC flush signals. Therefore, a protection switching time can be shortened by performing the switching operation using the first received switching request signal.

The master node discards a subsequently received AIS so as to prevent APS-down & MAC flush messages from being redundantly generated. For example, the master node N2 discards the subsequently received AIS as shown in FIG. 10, so as to prevent APS-down & MAC flush messages from being redundantly generated. The master node unblocks a previously blocked port using the AIS first received by the master node N2 and notifies that a current EPL is in use by sending an APS-down message to all nodes. The FDB can be updated using the MAC flush message.

On the other hand, when the master node no longer receives the switching request signal, the ring network returns to a state before protection switching (S24).

For example, when a bidirectional failure between the nodes N3 and N4 is recovered from, the master node N2 no longer receives the AIS. Therefore, the FDB is updated by notifying that the switching is released by sending the APS-up & MAC flush signals. At this time, the failure state can be monitored when an ETH-CC signal is exchanged between nodes according to the return to the normal state.

As apparent from the above description, the protection switching method and apparatus can perform fast protection switching when a network failure occurs.

That is, when a unidirectional or bidirectional link failure of a network device occurs, fast protection switching can be performed using a first received signal of at least two switching request signals.

The present invention can be used in technical fields for network switching in which a protection switching technology is implemented.

While the present invention has been described with reference to exemplary embodiments thereof, various possibilities for modifying these embodiments without departing from the spirit and scope of the invention as defined by the appended claims and their equivalents will be apparent to those skilled in the art.

What is claimed is:

1. A method for protection switching between network devices in a ring network, comprising:
designating a master node in the ring network;
receiving, by the master node, at least two switching request signals including a remote defect indication (RDI) and an alarm indication signal (AIS) from a network device neighboring a link in which a failure occurs; and
performing, by the master node, a switching operation in response to a first received signal of the at least two received switching request signals,
wherein the first received signal is received earlier than a second received signal of the at least two received switching request signals.

2. The method of claim 1, wherein the at least two received switching request signals comprise at least one of a remote defect indication (RDI) and an alarm indication signal (AIS) when the failure is a unidirectional failure.

3. The method of claim 1, wherein one of the at least two received switching request signals comprise an AIS when the failure is a bidirectional failure.

4. The method of claim 1, wherein the performing of the switching operation comprises:
performing the switching operation in response to the first received signal and discarding a subsequently received switching request signal.

5. The method of claim 1, further comprising:
returning to a state before the protection switching when no switching request signal is received.

6. A master network device designated for protection switching in a ring network, the master network device comprising:
a receiver that receives at least two switching request signals including a remote defect indication (RDI) and an alarm indication signal (AIS) from one of network devices neighboring a link in which a failure occurs; and
a switch that performs a switching operation in response to a first received signal of the at least two received switching request signals,
wherein the first received signal is received earlier than a second received signal of the at least two received switching request signals.

7. The network device of claim 6, wherein the at least two received switching request signals comprise at least one of an RDI and an AIS when the failure is a unidirectional failure.

8. The network device of claim 6, wherein one of the at least two received switching request signals comprise an AIS when the failure is a bidirectional failure.

9. The network device of claim 6, wherein the switch performs the switching operation in response to the first received signal and discards a subsequently received switching request signal.

10. The network device of claim 6, further comprising:
a recovery unit that makes a return to a state before the protection switching when no switching request signal is received.

11. The method of claim 1, wherein the two request signals are transmitted in opposed directions in the ring network.

12. The network device of claim 6, wherein the two request signals are transmitted in opposed directions in the ring network.

13. The method of claim 1, wherein the step of performing comprises:
generating, by the master node, messages for performing protection switching; and
sending the messages from the master node to other nodes in the ring network to reconfigure the ring network.

* * * * *